United States Patent [19]
Nicolette et al.

[11] Patent Number: 5,975,581
[45] Date of Patent: Nov. 2, 1999

[54] SYSTEM FOR CONFIRMING THE AUTHENTICITY OF AN ARTICLE USING A MAGNETIC READER

[75] Inventors: Thomas A. Nicolette, Centerport; Peter Y. Zhou; Dexing Pang, both of Smithtown, all of N.Y.

[73] Assignee: Sentry Technology Corp., Hauppauge, N.Y.

[21] Appl. No.: 09/139,844

[22] Filed: Aug. 25, 1998

[51] Int. Cl.[6] .................................................. B32B 29/02
[52] U.S. Cl. .............................. 283/70; 283/79; 283/80; 283/82; 283/85
[58] Field of Search .................................. 283/70, 79, 80, 283/82, 85

[56] References Cited

U.S. PATENT DOCUMENTS 5,756,220   5/1998   Hoshino et al. ......................... 283/82

*Primary Examiner*—Willmon Fridie, Jr.
*Assistant Examiner*—Mark T. Henderson
*Attorney, Agent, or Firm*—Stroock & Stroock & Lavan LLP

[57] ABSTRACT

A method for confirming the authenticity of an article including placing a semi hard piece of material on an article then printing a magnetic pattern on the semi hard piece of material. In order to view the pattern, a viewer containing a suspension of materials will be placed over the semi hard piece of material. The suspension of materials will then orient in the presence of a magnetic field adjacent to the magnetic material.

4 Claims, 1 Drawing Sheet

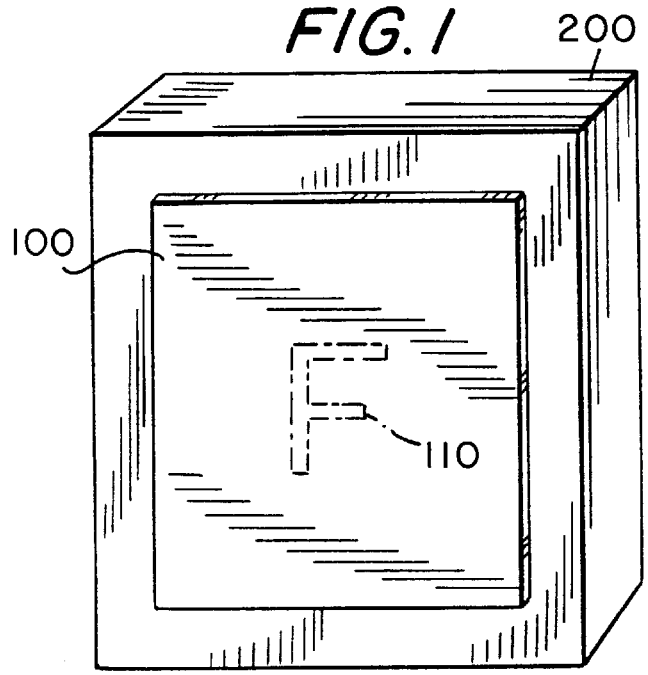
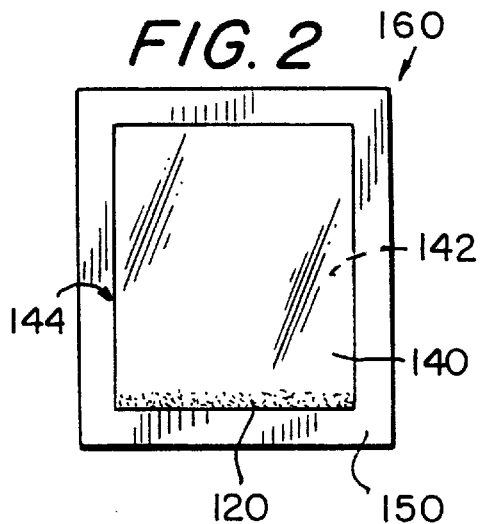
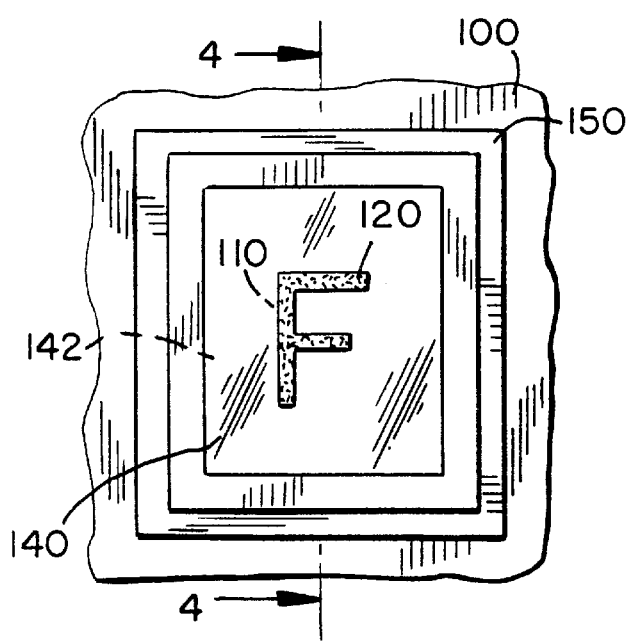
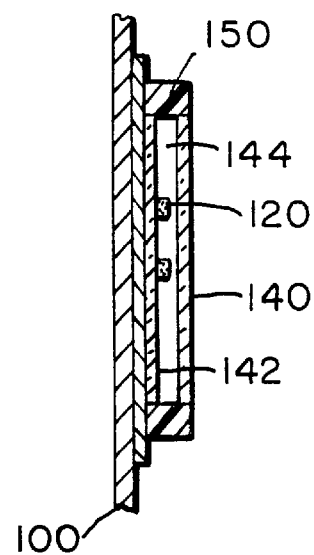

SYSTEM FOR CONFIRMING THE AUTHENTICITY OF AN ARTICLE USING A MAGNETIC READER

BACKGROUND OF THE INVENTION

The invention relates generally to detecting the authenticity of products and more particularly to a system and method for confirming the authenticity of an article utilizing a magnetic reader.

Various products which are covered by United States Patents and Trademarks are manufactured overseas and then imported into the United States. When products are imported into the United States, customs officials will inspect products for their authenticity. A problem which arises deals with that of "knock offs" or gray market goods. Knock off goods are those which are manufactured not by the owner of the patents or trademarks covering these products, but rather by third party individuals attempting to pass off their goods for those of the legitimate patent and trademark owners. Gray market goods are those goods which are intended for one market, but diverted to another. Thus, a need has arisen for a system through which an inspector can quickly and easily determine the identity of an authentic article as opposed to counterfeit goods or to keep track of gray market goods.

Previously manufacturers would mark their products in order to distinguish them from counterfeit goods. This system had been satisfactory, however, often this would ruin the aesthetics of the product or be easily copied by the counterfeiter. Accordingly, what is needed is a system for recognizing legitimate products as opposed to counterfeit goods which is not readily observable with the naked eye or easily reproducible. Thus, for the purpose of protecting from counterfeiting or diversion it is desired to have markers on the goods which are to be produced hard to copy, and do not affect the aesthetics of the article.

Accordingly, a system and method for detecting authentic articles is not satisfactorily found in the prior art.

SUMMARY OF THE INVENTION

Generally speaking, in accordance with the invention, a method and system for confirming the authenticity of an article is provided. This system and method can include placing a semi hard piece of material on an article then printing a magnetic pattern on the semi hard piece of material. In order to view the pattern, a suspension of magnetic materials will be placed over the semi hard piece of material. The suspension of materials will then orient in the presence of a magnetic field adjacent to the magnetic material revealing the information encoded on the article.

The suspension of materials may be present in a hand held viewer. Further, the suspension of materials may consist of metallic particles. The viewer may consist of a transparent material such as glass or plexiglass. Two pieces of this transparent material should be affixed together leaving enough space in between to place the suspension of materials such as lead, such that when they are placed adjacent to or over the semi hard material the lead shavings will orient themselves in the form of the pattern which is etched upon the semi hard material.

An object of the invention is to provide an improved system and method of detecting authentic goods.

Still other objects and advantages of the invention will in part be obvious and will in part be apparent from the specification.

The invention accordingly comprises the several steps and the relation of one or more of such steps with respect to each of the others thereof, which will be exemplified in the method hereinafter disclosed, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a top plan view of a substrate with a printed magnetic pattern constructed in accordance with the invention;

FIG. 2 is a top plan view of a viewer constructed in accordance with the invention;

FIG. 3 is a top plan view of a viewer revealing the pattern in accordance with the invention;

FIG. 4 is a cross sectional view along line 4—4 of FIG. 3.

DETAILED DESCRIPTION OF THE INVENTION

Reference is made to FIGS. 1–4 which show the system for authenticating the article in accordance with the invention. Material 100 is placed on an article 200. A magnetic pattern 110 is formed on material 100. Magnetic pattern 110 is invisible to the unaided eye and provides a pattern which identifies the article 200 as genuine, i.e., authenticates it.

A viewer 160 constructed in accordance with the invention consists of two substrates 140 and 142. At least one substrate is made of a transparent material such as glass or plexiglas. Non magnetic substrates 140, 142 are held together by a border material 150 to form a cavity 144 between border 150 and substrates 140, 142. Suspension of magnetic materials 120 is disposed within cavity 144. Suspension of magnetic materials 120 can move freely within cavity 144. When the viewer 160 is passed over the semi hard material 100 with the printed magnetic pattern 110, the suspension of magnetic materials will be attracted to the pattern 110 to orient itself to mimic the pattern such that the printed magnetic pattern 1 10 is revealed to the eye of the user.

During use a manufacturer of a product would place semi rigid material 100 onto an article 200. Then, the material 100 is printed with an invisible magnetic pattern 110. The pattern may be one or more letters, numbers or designs which identify the article as genuine. The article 200 is then shipped. To confirm authenticity at arrival, a viewer 160 having a suspension of magnetic materials 120 therein is placed adjacent pattern 110 to reveal the pattern.

With such a structure, it is possible to use an invisible marker, which is easy to read, without disturbing the aesthetics of the article 200 to prevent counterfeiting.

In a preferred embodiment of the invention, the coercivity force of the printed magnetic pattern 110 is between 80 and 200 Oe. "Printed" magnetic pattern 110 may be formed by deformation of material 100, overlaying a magnetic substance on material 110 or the like. Printing is used to mean generically forming a pattern on the substrate.

It will thus be seen that the objects set forth above, among those made apparent from the preceding description, are efficiently attained and, since certain changes may be made in carrying out the above method and system without departing from the spirit and scope of the invention, it is intended that all matter contained in the above description shall be interpreted as illustrative and not in a limiting way.

It is also to be understood that the following claims are intended to cover all of the generic and specific features of the invention herein described and all statements of the scope of the invention which, as a matter of language, might be said to fall therebetween.

What is claimed is:

1. A method for confirming the authenticity of an article comprising;
   placing a semi hard piece of material on an article;
   printing a magnetic pattern on the semi hard piece of material; and
   placing a suspension of materials which orient in the presence of a magnetic field adjacent said magnetic pattern.

2. The method according to claim 1, wherein a coercivity force of the printed magnetic pattern is between 80 and 200 Oe.

3. A system for confirming the authenticity of an article comprising;
   a semi hard piece of material disposed on an article;
   magnetic pattern disposed on the semi hard piece of material; and
   a suspension of materials which orient in the presence of a magnetic field adjacent said magnetic pattern.

4. The system according to claim 3, wherein a coercivity force of the printed magnetic pattern is between 80 and 200 Oe.

* * * * *